United States Patent
Peng et al.

(10) Patent No.: US 6,680,973 B2
(45) Date of Patent: Jan. 20, 2004

(54) SCALABLE MPEG-2 VIDEO DECODER WITH SELECTIVE MOTION COMPENSATION

(75) Inventors: Shaomin Peng, Yorktown Heights, NY (US); Mihaela van der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 441 days.

(21) Appl. No.: 09/821,140

(22) Filed: Mar. 29, 2001

(65) Prior Publication Data

US 2002/0172284 A1 Nov. 21, 2002

(51) Int. Cl.[7] .................................................. H04N 7/12
(52) U.S. Cl. ................................................ 375/240.15
(58) Field of Search ....................... 375/240.15, 240.02, 375/240.03, 240.12, 240.16, 240.23, 240.25; 348/387.1, 390.1, 394.1, 403.1, 404.1, 407.1, 409.1, 413.1, 416.1, 420.1, 421.1, 424.1; 382/233, 238, 248, 251; H04N 7/12

(56) References Cited

U.S. PATENT DOCUMENTS 5,253,054 A  10/1993  Fujiwara et al. ............. 358/133
5,768,536 A  * 6/1998  Strongin et al. ............. 709/247
6,226,327 B1 * 5/2001  Igarashi et al. ........ 375/240.14
6,310,915 B1 * 10/2001  Wells et al. ........... 375/240.03
6,580,759 B1 * 6/2003  Peng ..................... 375/240.25

FOREIGN PATENT DOCUMENTS

EP          0712252 A1     5/1996    ............ H04N/7/36

* cited by examiner

*Primary Examiner*—Nhon Diep

(57) ABSTRACT

A decoder system having a motion compensation system that scales the processing of B pictures in order to save computational resources. The motion compensation system has a first scaling system that includes comparing a motion vector magnitude of each macroblock in a B picture with a predetermined threshold. A system for performing a routine decoding operation for each macroblock in which the motion vector magnitude is greater than the predetermined threshold and a system for copying a corresponding macroblock from a previous picture for each macroblock in which the motion vector magnitude is less than or equal to the predetermined threshold. A second scaling system that includes calculating an average motion vector magnitude for a first B picture and replacing a next contiguous B picture with the first B picture if the average motion vector magnitude is less than or equal to a predetermined threshold.

26 Claims, 2 Drawing Sheets

SCALABLE MPEG-2 VIDEO DECODER WITH SELECTIVE MOTION COMPENSATION

BACKGROUND OF THE INVENTION

1. Technical Field

The present invention relates to decoding compressed video signals, and more particularly relates to a system and method for scaling the processing of B pictures in a motion compensation system of an MPEG-2 video decoder.

2. Related Art

The MPEG standards are an evolving set of standards for video and audio compression developed by the Moving Picture Experts Group (MPEG). MPEG-1 was designed for coding progressive video at a transmission rate of about 1.5 million bits per second. It was designed specifically for Video-CD and CD-i media. MPEG-2 was designed for coding interlaced images at transmission rates above 4 million bits per second. The MPEG-2 standard is used for various applications, such as digital television (DTV) broadcasts, digital versatile disk (DVD) technology, and video storage systems.

According to the MPEG-2 standard, a video sequence is divided into a series of GOPs (Group Of Pictures). Each GOP begins with an Intra-coded picture (I picture) followed by an arrangement of forward Predictive-coded pictures (P pictures) and Bi-directionally predictive-coded pictures (B pictures). I pictures are fields or frames coded as a stand-alone still image. P pictures are fields or frames coded relative to the nearest I or P picture, resulting in forward prediction processing. P pictures allow more compression than I pictures through the use of motion compensation, and also serve as a reference for B pictures and future P pictures. B pictures are coded with fields or frames that use the most proximate past and future I and P pictures as references, resulting in bi-directional prediction.

As digital TV gradually begins to dominate the TV market and other video applications become more desirable, the demand for systems having advanced capabilities for processing MPEG-2 pictures becomes stronger and stronger. The current emerging architecture for processing MPEG-2 pictures, such as that found in DTV set-top boxes and high end digital TV's, typically utilize a combination of a digital signal processing central processing units (DSPCPU), control processors, coprocessors, and software applications. Unfortunately, even with all these resources, advanced audio/visual processing functions tend to consume more computational power than is often available.

One of the key elements in MPEG-2 processing is the MPEG-2 decoder, which converts a bitstream 11 of compressed MPEG-2 data into pixel images. The main components of a standard MPEG-2 decoder 10 are shown in FIG. 1. There are four functional blocks: a variable length decoder (VLD) 12, an inverse quantization (IQ) system 14, an inverse discrete cosine transform system (IDCT) 16, and a motion compensation (MC) system 18. Memory 20 is used to store the reference frames. The adder 22 combines the error residuals output from IDCT 16 with motion compensation results to form the final video output 24. Unfortunately, each of these functional components consume a significant amount of computational power, which drives up the cost, and limits the flexibility of digital video systems using MPEG-2 technology. Accordingly, making a highly efficient, cost effective decoder remains one of the main goals of all electronics manufacturers.

One solution for addressing the processing requirements of MPEG-2 decoders is to provide specialized hardware systems that increase computational power. Unfortunately, while overall hardware costs continue to decrease, the costs involved in designing and building specialized hardware such as this increase the expense of the decoder.

A preferred solution therefore is to implement as much functionality as possible in software, which provides significant cost and flexibility advantages over hardware solutions. In particular, software solutions reduce the need for expensive hardware, such as coprocessors, and will allow multiple video functions to run concurrently on a DSPCPU core. However, software applications tend to run too slow to handle occasions when computationally intensive applications are required. Accordingly, a need exists to provide enhanced software systems that will provide inexpensive MPEG-2 decoder solutions while maintaining an acceptable level of video quality.

SUMMARY OF THE INVENTION

This invention overcomes the above-mentioned problems, as well as others, by providing a decoder system in which the complexity of B picture processing is scaled by a scalable motion compensation system. In a first aspect, the invention includes a method for processing B pictures in a motion compensation system, comprising the steps of: comparing a motion vector magnitude of each macroblock in a B picture with a predetermined threshold; performing a routine decoding operation on each macroblock in which the motion vector magnitude is greater than the predetermined threshold; and copying a corresponding macroblock from a reference picture for each macroblock in which the motion vector magnitude is less than or equal to the predetermined threshold.

In a second aspect, the invention provides a method of processing contiguous B pictures by a motion compensation system, comprising the steps of: calculating an average motion vector magnitude for a first B picture; and replacing a next contiguous B picture with the first B picture if the average motion vector magnitude of the first B picture is less than or equal to a predetermined threshold.

In a third aspect, the invention provides a program product stored on a recordable medium for processing B pictures in a motion compensation system that when executed, comprises: a system for comparing a motion vector magnitude of each macroblock in a B picture with a predetermined threshold; a system for performing a routine decoding operation on each macroblock in which the motion vector magnitude is greater than the predetermined threshold; and a system for copying a corresponding macroblock from a previous picture for each macroblock in which the motion vector magnitude is less than or equal to the predetermined threshold.

In a fourth aspect, the invention provides a program product stored on a recordable medium for processing contiguous B pictures in a motion compensation system, which when executed comprises: a system for calculating an average motion vector magnitude for a first B picture; and a system for replacing a next contiguous B picture with the first B picture if the average motion vector magnitude is less than or equal to a predetermined threshold.

In a fifth aspect, the invention provides a decoder system having a motion compensation system, wherein the motion compensation system comprises: a system for comparing a motion vector magnitude of each macroblock in a B picture with a predetermined threshold; a system for performing a routine decoding operation for each macroblock in which the motion vector magnitude is greater than the predetermined threshold; and a system for copying a corresponding macroblock from a previous picture for each macroblock in which the motion vector magnitude is less than or equal to the predetermined threshold.

In a sixth aspect, the invention provides a decoder system having a motion compensation system, wherein the motion compensation system comprises: a system for calculating an average motion vector magnitude for a first B picture; and a system for replacing a next contiguous B picture with the first B picture if the average motion vector magnitude is less than or equal to a predetermined threshold.

In a seventh aspect, the invention provide a decoder system having a motion compensation system, wherein the motion compensation system comprises: a system for calculating an average motion vector magnitude for a reference picture; and a system for replacing a B picture with the reference picture if the average motion vector magnitude is less than or equal to a predetermined threshold.

Accordingly, it is an advantage of the present invention to provide a system for scaling the processing of B pictures in a video processing system.

It is a further advantage to provide a system and method for efficiently scaling a motion compensation system within a decoder while maintaining an acceptable level of output quality.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE INVENTION

Overview

Figure 2:
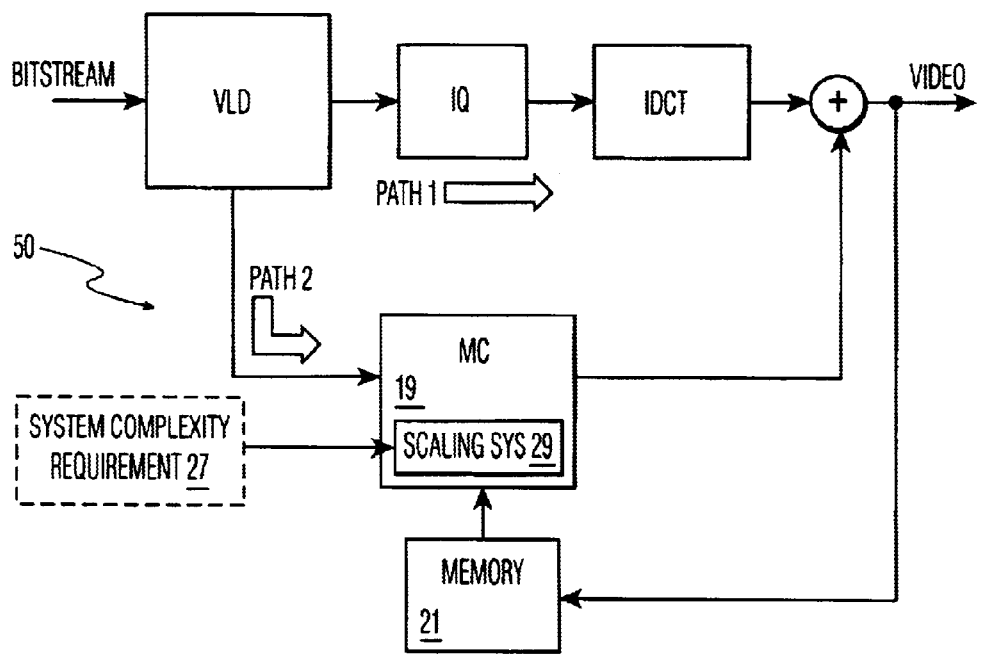
FIG. 2 depicts a functional diagram of a video decoder having a scalable motion compensation system.

Referring to FIG. 2, a scalable MPEG-2 decoder 50 is shown. Scalable MPEG-2 decoder 50 includes a motion compensation system 19 having a scaling system 29 (described in further detail below) that is instructed by a system complexity requirement 27. As noted above, in the MPEG-2 standard, there are three types of pictures: I, P and B, and the pictures are coded within a unit referred to as a group of pictures (GOP). From the MPEG-2 decoding system point of view, I pictures require decoding only along the first processing path, (PATH 1) which decodes coded pixel data. For decoding P and B pictures, two processing paths exist. In particular, the first processing path (PATH 1) decodes the coded prediction error residual and a second processing path (PATH 2) decodes the motion compensation results. The combination of these two paths gives the final decoded pixel output.

The present invention provides a scaling system 29 for selectively reducing (i.e., scaling) the computational resources required by a typical decoder. To achieve this, three important factors are considered. First, experiments have shown that for decoding typical I, P, or B pictures, about 30% of the computational resources are used by the motion compensation system. Accordingly, significant computational savings can potentially be achieved by scaling the motion compensation system 19.

Secondly, of the three types of pictures, B pictures provide the best opportunity for scaling since B pictures do not contribute to error accumulation and propagation. That is, B pictures have no impact on the quality of the following pictures. Alternatively, for I and P pictures (i.e., the reference pictures), the prediction drift accumulates and will propagate to the following pictures if the prediction is not accurate. Thus, unlike B pictures, any error made in I and P pictures may have critical consequences to subsequent pictures.

Thirdly, B pictures are the most computationally complex types of pictures. Thus, the scaling of B pictures provides the greatest potential computational savings.

Given the above factors, the present invention provides scaling system 29 for scaling the processing of B pictures within the motion compensation system 19 in order to save resources, while maintaining an acceptable level of overall quality degradation.

Exemplary Embodiments

Figure 3:
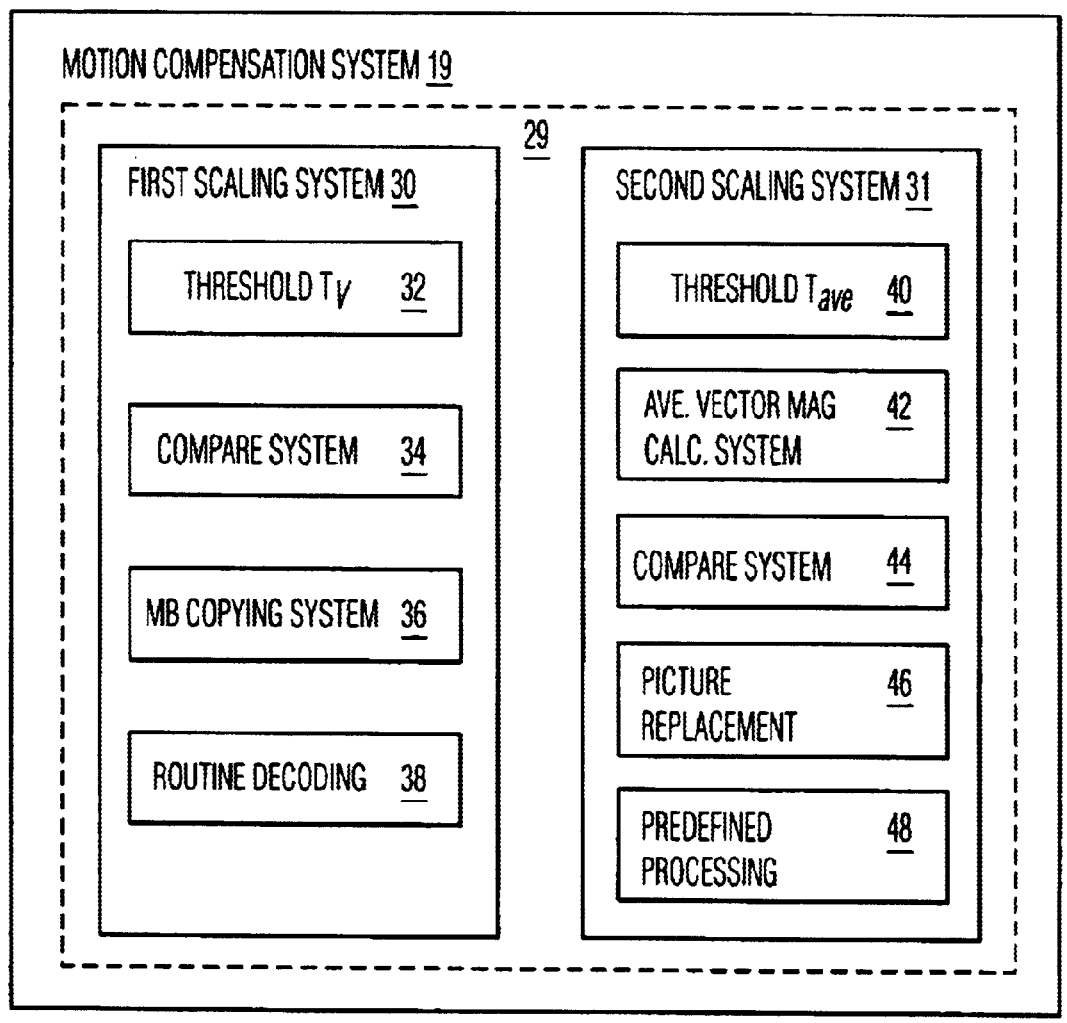
FIG. 3 depicts a block diagram of a motion compensation system having a first and a second scaling system in accordance with a preferred embodiment of the present invention.

Referring to FIG. 3, scalable motion compensation system 19 is shown in further detail. Motion compensation system 19 comprises scaling system 29 having a first and a second scaling system 30 and 31 for scaling the processing of B pictures. It should be recognized that the two systems 30 and 31 could be implemented together, separately, or in combination with other scaling systems. In addition, while the preferred embodiments are described with reference to an MPEG-2 decoder, it should be understood that invention could be applied to any type of video encoding system.

First scaling system 30 scales the processing of B pictures at the macroblock (MB) level. As is known in the art, each picture in an MPEG-2 encoding scheme is made up of a plurality of macroblocks, which are individually processed during the decoding operation. In addition, each macroblock generally includes a motion vector that facilitates data compression by pointing to macroblocks of reference pictures. First scaling system 30 utilizes compare system 34 to compare the magnitude of each macroblock's motion vector to a predetermined threshold value 32 to determine how the macroblock should be processed. If the motion vector for a current macroblock is less than or equal to the predetermined threshold value 32, then the current macroblock is not decoded. Rather, a corresponding macroblock from a reference picture is retrieved by MB copying system 36, thereby eliminating the need to process the current macroblock. Thus, system 30 simply uses the already decoded version of the previous macroblock. Alternatively, if the motion vector is greater than predetermined threshold value 32, the macroblock is processed with a routine decoding procedure 38 (e.g., the corresponding reference MB is fetched from memory 21 and the MB is decoded).

Assume macro block i has a motion vector $\vec{V}_i$. Let $T_V$ represent a pre-selected threshold. First scaling system 30 would implement the following rule for the scalability of B pictures:

$$\text{if } |\vec{V}_i| \begin{cases} \leq T_V, & \text{do not decode current } B \text{ } MB, \text{and do not} \\ & \text{fetch the corresponding } MB \text{ from the} \\ & \text{reference memory, copy previous frame's } MB \\ > T_V, & \text{do a routine decoding} \end{cases}$$

Figure 1:
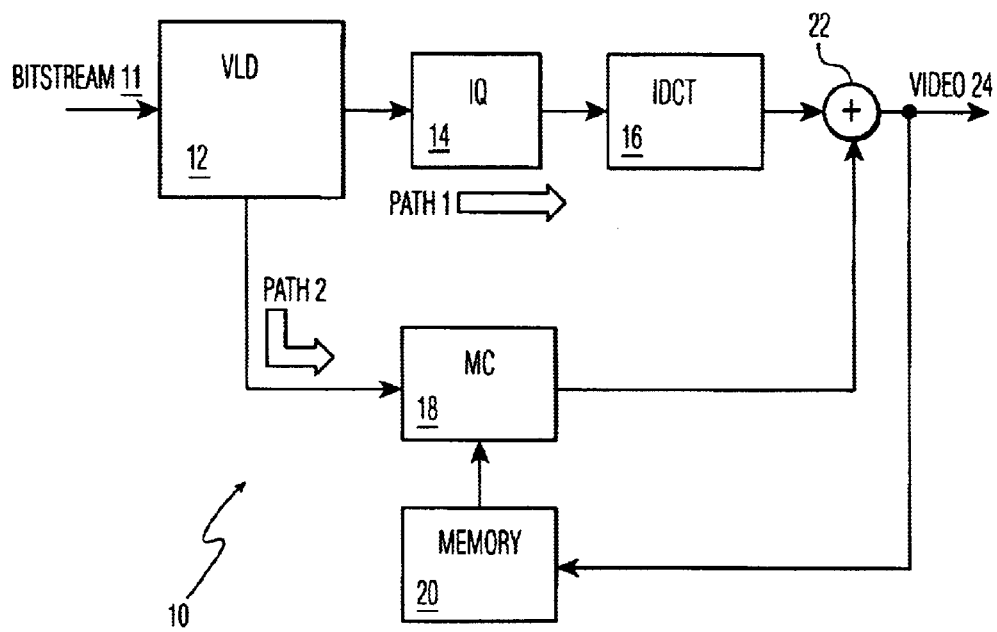
FIG. 1 depicts a functional diagram of a video decoder.

Under such a formula, the complexity level can be estimated as follows. Assume a GOP size of (M,N) where N is the number of pictures in the GOP and M-1 is the number of B pictures between reference pictures (I and P). Let $C_j$ represent the needed average compute power (complexity level) for the generic decoder 10 in FIG. 1 for each picture, where j indicates the VLD 12, IQ 14, IDCT 16, MC 18 and adder 22. For the generic decoder 10, the average complexity level per picture, denoted as $C_g$ within one GOP is estimated as $$C_g = \frac{C_{VLD} \cdot N + C_{IQ+IDCT} \cdot N + C_{MC} \cdot N_{P+B} + C_{adder} \cdot N_{P+B}}{N}.$$

Let $C_s$ represents the complexity level of MPEG-2 decoder 50 having the proposed scheme, and $\alpha$ be the ratio of decoded macroblocks to the total number of macroblocks. Then the average complexity level becomes:

$$C_s = \frac{\begin{array}{c}C_{VLD} \cdot N + C_{IQ+IDCT} \cdot (N_{I+P} + \alpha N_B) + \\ C_{MC} \cdot (N_P + \alpha N_B) + C_{adder} \cdot (N_P + \alpha N_B)\end{array}}{N}.$$

If it is assumed that $C_g=1$, then $$C_s = 1 - \frac{N_B}{N}(1-\alpha)(C_{IQ+IDCT} + C_{MC} + C_{adder}).$$

For a GOP size of N=15 and M=3, $N_B=10$. Therefore, if $\alpha=0.5$, which indicates 50% of the B pictures are decoded, then $$C_s = 1 - \frac{1}{3}(C_{IQ+IDCT} + C_{MC} + C_{adder}).$$

If $C_{IQ+IDCT}+C_{adder} \approx 30\%$ and $C_{MC} \approx 35\%$ (a reasonable assumption in an MPEG-2 decoder chain), then $C_s \approx 78\%$, which is 78% of the total non-scaled complexity.

As is evident, using the first scaling system 30 is very beneficial to the memory bandwidth. In image/video processing related integrated circuits, the processing bandwidth is extremely important. The most utilized memory architecture is the shared memory architecture, which is frequently running into congestion due to the large amount of image/video data accessed from the memory. With the proposed system 30, much less data is requested from the shared memory, thereby saving bandwidth.

Second scaling system 31 can be implemented to compliment first scaling system 30, or be implemented separately as a stand-alone scaling system. In general, second scaling system 31 is utilized when motion compensation system 19 processes multiple contiguous B pictures, i.e., when a plurality of B pictures reside between reference (I and P) pictures. Before processing a current B picture, second scaling system 31 utilizes calculation system 42 to examine an average vector magnitude for the previous B picture. Compare system 44 is then utilized to determine if the average vector magnitude falls below a predetermined threshold 40 (indicating low activity). If the average vector magnitude of the previous B picture is less than the threshold, then the current B picture is replaced with the previous B picture using picture replacement system 46. It should be understood that picture replacement system 46 does not need to actually perform a memory copy operation. Rather, since the previous B picture will already reside in the memory buffer (from the previous B picture processing operation), system 46 can simply reference the previous B picture in the memory buffer.

Alternatively, if the average vector magnitude of the previous B picture is greater than the threshold (indicating high activity), then a predefined processing operation 48 can be utilized. Predefined processing operation 48 can comprise any type of decoding operation, and may include, for example, first scaling system 30, a routine decoding operation 38, or some other scaling operation.

The following describes the case where second scaling system 31 is implemented to compliment first scaling system 30. As noted, in order for second scaling system 31 to be implemented, there must be a contiguous stream of B pictures, i.e., M>2 indicating that there are a multiple number of B pictures between reference pictures. The first B picture between two reference pictures is decoded with a predefined processing operation 48. The following B pictures are decoded as follows.

Assume there are a total of L macro-blocks in the previously decoded B picture, $B_p$. An average vector magnitude can then be calculated for the previous B picture by summing the individual vector magnitudes of each macroblock, and dividing the sum by L. A predetermined threshold $T_{ave}$ is used as a motion measure for $B_p$, such that the current B picture will be judged for either: (1) predefined decoding, or (2) copying from $B_p$, based on the following formula:

$$\frac{1}{L}\sum_1^L |\vec{V}_i|_{previousB} \begin{cases} \leq T_{ave} & \text{copy } B_p, \\ > T_{ave} & \text{follow first scaling system 30} \end{cases}$$

Using this formula, the total complexity can be estimated as follows. The total number of B pictures, $\xi_B$, within one GOP is estimated as:

$$\xi_B = N - \left\lceil \frac{N}{M} \right\rceil.$$

If $\beta$ represents the fraction of $\xi_B$ B pictures that use the first scaling system 30 (i.e., pictures that do not get copied), then the total complexity is estimated as:

$$C_s = 1 - \frac{N_B}{N}(1-\beta)(C_{VLD} + C_{IQ+IDCT} + C_{MC} + C_{adder}).$$

Using the same example as shown above with regard to first scaling system 30, and assuming $\beta=0.5$, the total complexity per picture will be $$C_s = 1 - \frac{1}{3}(C_{VLD} + C_{IQ+IDCT} + C_{MC} + C_{adder}).$$

If $C_{IQ+IDCT}+C_{adder} \approx 30\%$, $C_{MC} \approx 35\%$ and $C_{VLC} \approx 35\%$ (a reasonable assumption in the decoder chain), then $C_s \approx 66\%$, which is 66% of the total complexity.

As would be expected, when second scaling system 31 is combined with first scaling system 30, even more complexity savings can be obtained. The saved complexity from both systems can be used for other more needed computations. It is particularly interesting to note that the compute power saved from skipping the whole B picture computation (second scaling system 31) is significant. Such savings can be easily redirected to more pressing post-processing operations.

In a further embodiment, the second scaling system 31 can be implemented to examine a reference picture to determine how to process a B picture. Specifically, average vector magnitude calculation system 42 can examine the average vector magnitude of a reference picture. If the average vector magnitude is less than or equal to a predetermined threshold, then the B picture can be replaced by the reference picture. Using this methodology, the processing of a first B picture after a reference picture can be also scaled to further save resources.

It is understood that motion compensation system 19, as well as first and second scaling systems 30 and 31 can be implemented in hardware, software, or a combination of hardware and software. They may be implemented by any type of computer system—or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims. For instance, although the description provided herein generally relates to MPEG-2 decoders, it is understood that the invention can be applied to any wavelet-based or motion-based coding schemes that process B pictures (or their equivalents). Examples of such schemes include, but are not limited to, MPEG-1, MPEG-2, MPEG-4, H.26L, H.261, and H.263.

We claim:

1. A method for decoding B pictures in a motion compensation system, comprising the steps of:
   comparing a motion vector magnitude of each macroblock in a B picture with a predetermined threshold;
   performing a routine decoding operation on each macroblock in which the motion vector magnitude is greater than the predetermined threshold; and
   copying a corresponding macroblock from a reference picture for each macroblock in which the motion vector magnitude is less than or equal to the predetermined threshold.

2. The method of claim 1, wherein the step of performing the routine decoding operation includes the step of fetching a corresponding macroblock from a reference memory.

3. The method of claim 1, wherein the motion compensation system is part of a MPEG-2 decoder.

4. The method of claim 1, wherein a next contiguous B picture is processed using the further steps of:
   calculating an average motion vector magnitude from a previous B picture; and
   if the average motion vector magnitude is less than or equal to a second predetermined threshold, replacing the next contiguous B picture with the previous B picture.

5. The method of claim 4, comprising the further step of:
   processing the next contiguous B picture using the comparing, performing and copying steps of claim 1 if the average motion vector magnitude is greater than the second predetermined threshold.

6. The method of claim 4, wherein the average motion vector magnitude is calculated by summing the motion vector magnitude of each macroblock, and dividing by the number of macroblocks.

7. A method of decoding contiguous B pictures by a motion compensation system, comprising the steps of:
   decoding a first B picture using a predefined processing operation;
   calculating an average motion vector magnitude for the first B picture; and
   replacing a next contiguous B picture with the first B picture if the average motion vector magnitude is less than or equal to a predetermined threshold.

8. The method of claim 7, comprising the further step of processing the next contiguous B picture using the predefined processing operation if the average motion vector magnitude is greater than the predetermined threshold.

9. A program product stored on a recordable medium for processing B pictures in a motion compensation system that when executed, comprises:
   a system for comparing a motion vector magnitude of each macroblock in a B picture with a predetermined threshold;
   a system for performing a routine decoding operation on each macroblock in which the motion vector magnitude is greater than the predetermined threshold; and
   a system for copying a corresponding macroblock from a reference picture for each macroblock in which the motion vector magnitude is less than or equal to the predetermined threshold.

10. The program product of claim 9, wherein the routine decoding operation fetches a corresponding macroblock from a reference memory.

11. The program product of claim 9, wherein the motion compensation system is part of an MPEG-2 decoder.

12. The program product of claim 9, further comprising a system for processing contiguous B pictures that includes:
   a system for calculating an average motion vector magnitude from a first B picture; and
   a system for replacing a second contiguous B picture with the first B picture if the average motion vector magnitude is less than or equal to a second predetermined threshold.

13. The program product of claim 12, further comprising:
   a system for processing the second B picture using the comparing, performing and copying systems if the average motion vector magnitude is greater than the second predetermined threshold.

14. The program product of claim 12, wherein the average motion vector magnitude is calculated by summing the motion vector magnitude of each macroblock, and dividing by the number of macroblocks.

15. A program product stored on a recordable medium for processing contiguous B pictures in a motion compensation system, which when executed comprises:
   a system for calculating an average motion vector magnitude for a first B picture; and a system for replacing a next contiguous B picture with the first B picture if the average motion vector magnitude is less than or equal to a predetermined threshold.

16. The program product of claim 15, further comprising a system for processing the next contiguous B picture using a predefined processing operation if the average motion vector magnitude is greater than the predetermined threshold.

17. A decoder system having a motion compensation system, wherein the motion compensation system comprises:

a system for comparing a motion vector magnitude of each macroblock in a B picture with a predetermined threshold;

a system for performing a routine decoding operation for each macroblock in which the motion vector magnitude is greater than the predetermined threshold; and a system for copying a corresponding macroblock from a reference picture for each macroblock in which the motion vector magnitude is less than or equal to the predetermined threshold.

18. The decoder system of claim 17, wherein the routine decoding operation fetches a corresponding macroblock from a reference memory.

19. The decoder system of claim 17, wherein the decoder system is an MPEG-2 decoder.

20. The decoder system of claim 17, wherein the motion compensation system further comprises a system for processing contiguous B pictures, the system for processing contiguous B pictures includes:

a system for calculating an average motion vector magnitude from a first B picture; and a system for replacing a second contiguous B picture with the first B picture if the average motion vector magnitude is less than or equal to a second predetermined threshold.

21. The decoder system of claim 20, wherein the motion compensation system further comprises:

a system for processing the second B picture using the comparing, performing and copying systems if the average motion vector magnitude is greater than the second predetermined threshold.

22. A decoder system having a motion compensation system, wherein the motion compensation system comprises:

a system for calculating an average motion vector magnitude for a first B picture; and a system for replacing a next contiguous B picture with the first B picture if the average motion vector magnitude is less than or equal to a predetermined threshold.

23. The decoder system of claim 22, wherein the motion compensation system further comprises a system for processing the next contiguous B picture using a predefined processing operation if the average motion vector magnitude is greater than the predetermined threshold.

24. A decoder system having a motion compensation system, wherein the motion compensation system comprises:

a system for calculating an average motion vector magnitude for a reference picture; and a system for replacing a B picture with the reference picture if the average motion vector magnitude is less than or equal to a predetermined threshold.

25. The decoder system of claim 24, wherein the motion compensation system further comprises a system for processing the B picture using a predefined processing operation if the average motion vector magnitude is greater than the predetermined threshold.

26. The decoder system of claim 24, wherein the average motion vector magnitude is calculated by summing the motion vector magnitude of each macroblock in the reference picture, and dividing by the number of macroblocks.

* * * * *